(12) United States Patent
Beda, III

(10) Patent No.: US 9,286,092 B1
(45) Date of Patent: Mar. 15, 2016

(54) VIRTUAL MACHINE DISK IMAGES

(71) Applicant: GOOGLE INC., Mountain View, CA (US)

(72) Inventor: Joseph S. Beda, III, Seattle, WA (US)

(73) Assignee: Google Inc., Mountain View, CA (US)

( * ) Notice: Subject to any disclaimer, the term of this patent is extended or adjusted under 35 U.S.C. 154(b) by 197 days.

(21) Appl. No.: 13/833,241

(22) Filed: Mar. 15, 2013

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 8,073,926 B2 | 12/2011 | Traut et al. | |
| 8,627,310 B2 | 1/2014 | Ashok et al. | |
| 2008/0134175 A1* | 6/2008 | Fitzgerald et al. | 718/1 |
| 2008/0134177 A1* | 6/2008 | Fitzgerald et al. | 718/1 |
| 2011/0055714 A1* | 3/2011 | Vemulapalli et al. | 715/739 |
| 2012/0005672 A1 | 1/2012 | Cervantes et al. | |
| 2012/0266170 A1 | 10/2012 | Zimmerman et al. | |
| 2013/0227567 A1* | 8/2013 | Horikawa | 718/1 |
| 2013/0254081 A1* | 9/2013 | Kurabayashi et al. | 705/34 |

OTHER PUBLICATIONS

'The Chromium Projects,' [online] "Chrome Release Channels," [retrieved on Jun. 11, 2014]. Retrieved from the Internet: URL: http://www.chromium.org/getting-involved/dev-channel, 4 pages.
'Ubuntu' [online] "Amazon EC2 AMI Locator," 2012. [Retrieved on Jul. 21, 2014]. Retrieved from the Internet: http://cloud-images.ubuntu.com/locator/ec2/, 3 pages.

* cited by examiner

*Primary Examiner* — Dong Kim
(74) *Attorney, Agent, or Firm* — Fish & Richardson P.C.

(57) ABSTRACT

Methods, systems, and apparatus, including computer programs encoded on a computer storage medium, for storing images of virtual machine virtual disks. One of the methods includes receiving a request from a first user to save a first virtual machine (VM) disk image, wherein the first VM disk image is an image of a virtual disk of a first VM instance and captures an application and operating system configuration of the first VM instance; in response to the request, providing data identifying a plurality of image tracks to the first user, wherein each image track is a collection of VM disk images; receiving data from the first user identifying a first image track of the plurality of image tracks; and adding the first VM disk image to the first image track, comprising associating data identifying the first VM disk image with data identifying the first image track.

9 Claims, 5 Drawing Sheets

200 ↘  206 ↘  208 ↘

| Name | Description | Labels | Versions |
|---|---|---|---|
| 202 ↘ Centos-6 | 204 ↘ CentOS 6 | Stable, Testing | V20120901, V20121000,... |
| Ubuntu-12-04 | Ubuntu 10,04 | Stable, Testing, Dev | V1.0, V1.1, V2.0 |

Centos-6

| Property | Value |
|---|---|
| Name | Centos-6 ╱252 |
| Description | CentOS6 ╱254 |
| Creation Time | 2012-09-01T 15:52:47,584 ╱256 |
| Versions | V20120901<br>V20121001 }258  [Add New] ╱262<br>V20121001.2 |
| Labels<br><br>Stable<br>Testing | <br><br>V20121001<br>V20121001.2 }260  [Edit Labels] ╱264 |

FIG. 2B

VIRTUAL MACHINE DISK IMAGES

BACKGROUND

This specification relates to storing images of virtual machine virtual disks.

Cloud computing is network-based computing in which collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines. In a public cloud computing environment, multiple users are able to launch virtual machines (VMs), and each VM launched by a user is included in a cluster of other VMs launched by the user.

SUMMARY

In general, one innovative aspect of the subject matter described in this specification can be embodied in methods that include the actions of receiving a request from a first user of a first user device to save a first virtual machine (VM) disk image, wherein the first VM disk image is an image of a virtual disk of a first VM instance and captures an application and operating system configuration of the first VM instance; in response to the request, providing data identifying a plurality of image tracks to the first user, wherein each image track is a collection of VM disk images; receiving data from the first user identifying a first image track of the plurality of image tracks; and adding the first VM disk image to the first image track, comprising associating data identifying the first VM disk image with data identifying the first image track.

Other embodiments of this aspect include corresponding systems, apparatus, and computer programs, configured to perform the actions of the methods, encoded on computer storage devices.

These and other embodiments can each optionally include one or more of the following features. Adding the first VM disk image to the first image track can include creating a new VM disk image version in the first image track, wherein the new VM disk image version identifies the first VM disk image instance by a user-specified version name.

The first image track can be associated with one or more image labels, and wherein each of the image labels associates a respective user-specified logical name with a respective one of the VM disk image instances in the image track.

The method can further include receiving a request from the first user to associate the first VM disk image with a first image label of the one or more image labels; and in response to the request, modifying association data for the first image label to associate the first image label with the first VM disk image.

The method can further include receiving a request from a second user to instantiate a second VM instance using the first image label; resolving the image label to identify the first VM disk image; and providing the first VM disk image for use in instantiating the second VM instance. The method can further include determining that one or more re-resolving criteria are satisfied; and in response to determining that the criteria are satisfied, re-resolving the first image label to determine whether the association data identifies a new VM disk image as being associated with the first image label. The method can further include: receiving a request from a third user to create a new image track; and in response to the request, providing a user interface for display to the third user for specifying values of one or more properties for the new image track.

Particular embodiments of the subject matter described in this specification can be implemented so as to realize one or more of the following advantages. By organizing saved virtual machine (VM) disk images into image tracks, users can easily locate and identify desired VM disk images for use in instantiating new VM instances. Users can easily determine when a newer version of a particular VM disk image is available. Users may also be able to easily identify when disk images being used to instantiate VM instances become out of date.

BRIEF DESCRIPTION OF THE DRAWINGS

FIG. 2A illustrates an example user interface that identifies available image tracks.

FIG. 2B illustrates an example user interface that provides a detailed view of an image track.

Like reference numbers and designations in the various drawings indicate like elements.

DETAILED DESCRIPTION

Figure 1:
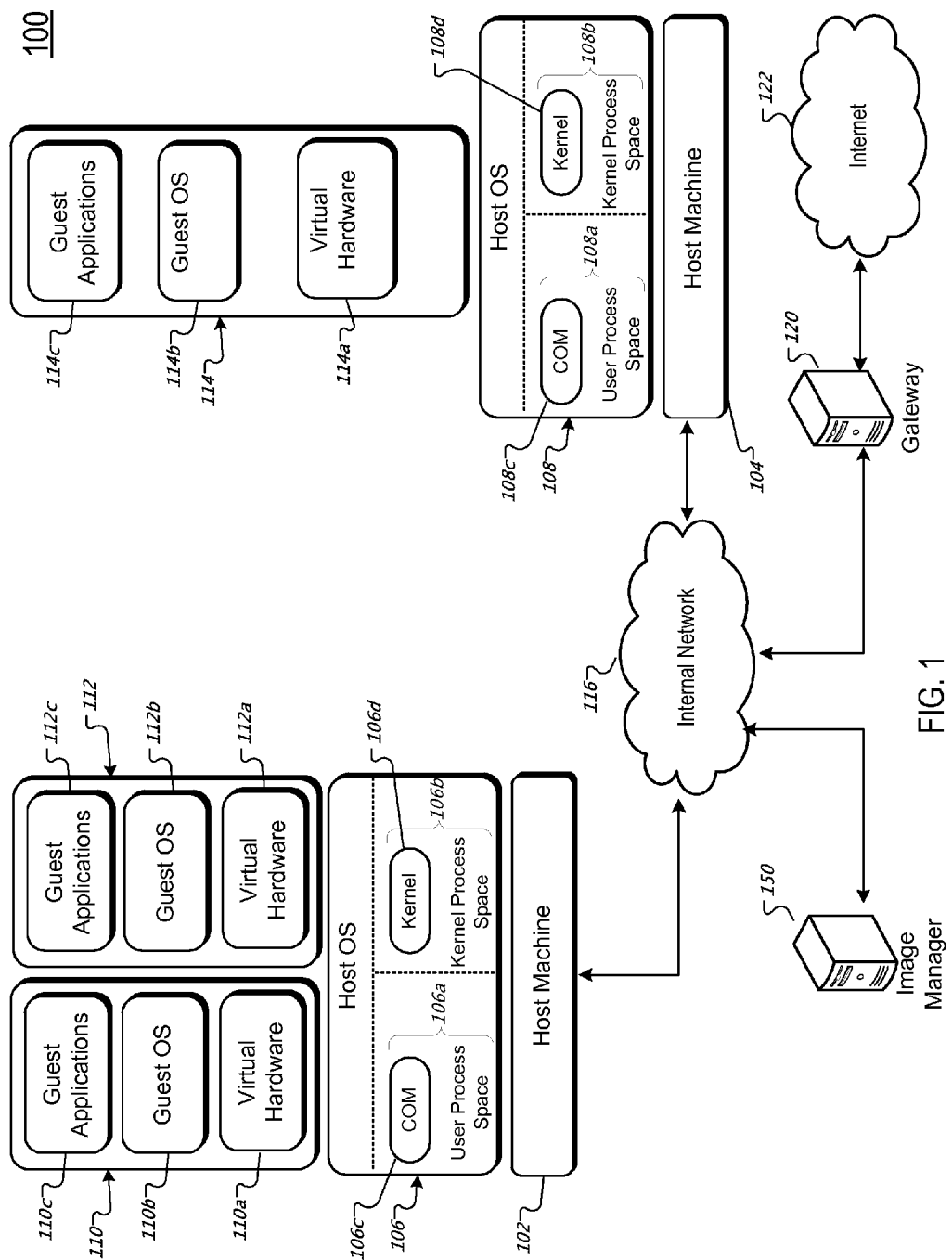
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatuses such as rack mounted servers or other computing devices. The data processing apparatuses can be in different physical locations and can have different capabilities and computer architectures. Host machines can communicate with each other through an internal data communications network 116. The internal network can include one or more wired (e.g., Ethernet) or wireless (e.g., WI-FI) networks, for example. In some implementations the internal network 116 is an intranet. Host machines can also communicate with devices on external networks, such as the Internet 122, through one or more gateways 120 which are data processing apparatuses responsible for routing data communication traffic between the internal network 116 and the external network 122. Other types of external networks are possible.

Each host machine executes a host operating system or other software that virtualizes physical hardware (e.g., the underlying host machine hardware or other hardware) and manages concurrent execution of one or more virtual machines. For example, the host operating system 106 is managing virtual machine (VM) 110 and VM 112, while host OS 108 is managing a single VM 114. Each VM includes a simulated version of the underlying host machine hardware, or a different computer architecture. The simulated version of hardware is referred to as virtual hardware (e.g., virtual hardware 110a, 112a and 114a). Software that is executed by the virtual hardware is referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system. Each VM is also allocated virtual disk blocks from one or more virtual disk drives for use by the guest software executing on the VM. For example, host operating system 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example.

In addition to virtual memory and virtual disk resources, VMs can be allocated network addresses through which their respective guest software can communicate with other processes reachable through the internal network 116 or the Internet 122. The network addresses can be, for example, Internet Protocol (IP) addresses. In some implementations, each VM is allocated one or more unique Internet Protocol (IP) version 4 or version 6 addresses, one or more User Datagram Protocol (UDP) port numbers, or both. Other address schemes are possible.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system could be a variation of the UNIX operating system. Other operating systems are possible. Each VM can execute the same guest operating system or different guest operating systems. In further implementations, a VM does not require a guest operating system in order to execute guest software applications. A guest operating system's access to resources such as networks and virtual disk storage is controlled by the underlying host operating system, other cluster management software executing on a separate computing device, or both.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. Similarly, the kernel process space 108b is virtual memory reserved for the host operating system 108's kernel 108d.

The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process (e.g., communication process 106c or communication process 108c). In some implementations, the communication process executes in the user process space (e.g., user process space 106a or user process space 108a) of a host operating system (e.g., host operating system 106 or host operating system 108). In other implementations, the communication process can execute in the kernel process space (e.g., kernel process space 106d or kernel process space 108d) of the host operating system. There can be a single communication process for all VMs executing on a host machine or multiple communication processes, one for each VM executing on a host machine. In yet further implementations, some portion of the communication process executes in the user process space and another portion executes in the kernel process space. For example, the communications process 106c receives packets sent by VM 110 or VM 112 and forwards the packets to the destination identified in the packet.

In various implementations, it may be desirable for users of executing VMs to save an image of the virtual disk of the VM and make the VM disk image available to other users. The VM disk image captures the user's application and operating system configuration and can be used to re-instantiate the same configuration at a later time, e.g., by the same user or by a different user. More specifically, a VM disk image is an immutable set of bits used to instantiate a VM instance. A user can capture an image of a virtual disk image to generate a VM image instance using any of a variety of conventional techniques.

In order to save a VM disk image and make the image available to other users or for later use by the same user, the user can send a VM disk image track save request to an image manager 150. The image manager 150 is a system of one or more data processing apparatus in one or more physical locations and can process the request and make the saved VM disk image available for use in instantiating future VM instances. Advantageously, the image manager 150 organizes saved VM disk images into image tracks and allows the user to specify an image track in which each VM disk image instance is to be saved. An image track is a collection of one or more VM disk image instances, with each VM disk image instance managed by the image manager 150 being assigned to exactly one image track. Further, in some implementations, users can assign labels to the VM disk image instances in any given image track. The image labels are user-specified logical names, e.g., "testing" or "stable," that can be used to identify VM disk image instances and resolved to the specific VM disk image instance associated with the label by the image manager 150.

FIG. 2A illustrates an example user interface 200 that identifies available image tracks. The user interface 200 can be provided to a user device for presentation to a user by an image manager, e.g., the image manager 150 of FIG. 1, in response to a request to view available VM disk image instances. The user interface 200 identifies image tracks maintained by the image manager and that are available to the user. The image tracks available to the user may be all of or a subset of the image tracks maintained by the image manager. For example, users may be able to create private image tracks and make those images and tracks available only to certain other users.

The user interface 200 identifies a respective name and a respective description of each image track. The name of the image track is the unique identifier assigned to the track, e.g., the name 202 "centos-6." In some implementations, the name is user-specified. In other implementations, the name is generated by the image manager when a request is received to create an image track. The description of the image track is user-specified, e.g., the description 204 "CentOS 6," and is a free text description of the image track. In some implementations, the description of the image track is displayed to the user in place of the name rather than along with the name.

The user interface 200 also identifies labels and versions that are active in each image track. The active labels within an image track are labels that have been created and associated with VM disk image instances by users, e.g., labels 206 "stable and "testing." A version is a VM disk image instance that has been added to the image track and is identified by a name assigned to the VM disk image instance, e.g., versions 208 "v20120901" and "v20121000." In some implementations, a user can select, e.g., using an input device or by submitting a touch input, one of the identified image tracks in order to view more details about the image track, select one of the VM disk image instances to use in instantiating a VM, add a new VM disk image instance to the image track, or to edit the labels that are active within the image track.

FIG. 2B illustrates an example user interface 250 that provides a detailed view of an image track. In the illustrated example, the detailed view is of the image track named "centos-6" of FIG. 2A. The detailed view displays values of various properties of the image track and allows users to modify one or more of the properties, i.e., the active labels in the image track or the VM disk images in the image track. In particular, the user interface 250 displays the value of a name property 252, i.e., the name "centos-06," and the value of a description property 254, i.e., the description "CentOS 6." The user interface also displays a value of a creation time property 256 that identifies the time that the image track was created, i.e., the creation time "2012-09-01T15:52:47.584."

The user interface 250 also identifies the VM disk image instances 258 that are included in the image track, each identified by the respective version name assigned to the instance. Depending on the implementation, the version names may be displayed in the form of links that, when selected by the user, allow the user to instantiate a new VM instance using the VM disk image instance identified by the selected version name. Alternatively, the links may allow a user to view more detailed information about the selected VM disk image instance. The user interface 250 includes a user interface element 262 that, when selected, allows the user to add new VM disk image instances to the image track.

The user interface 250 also identifies the labels 260 that are active in the image track and the respective version names 262 of the VM disk image instances that have been associated with each label. Depending on the implementation, the image names may be displayed in the form of links that, when selected by the user, allow the user to instantiate a new VM instance using the VM disk image instance identified by the selected image name. Alternatively, the links may allow a user to view more data about the selected image and the VM disk image instance currently associated with the selected image. The user interface 250 includes a user interface element 264 that, when selected, allows the user to modify the active images in the image track. That is, the user may be able to submit an input that creates a new image label and associates the label with a VM disk image instance. The user may also be able to submit at an input that modifies an association of an existing image label, i.e., associates the label with a different VM disk image instance.

Figure 3:
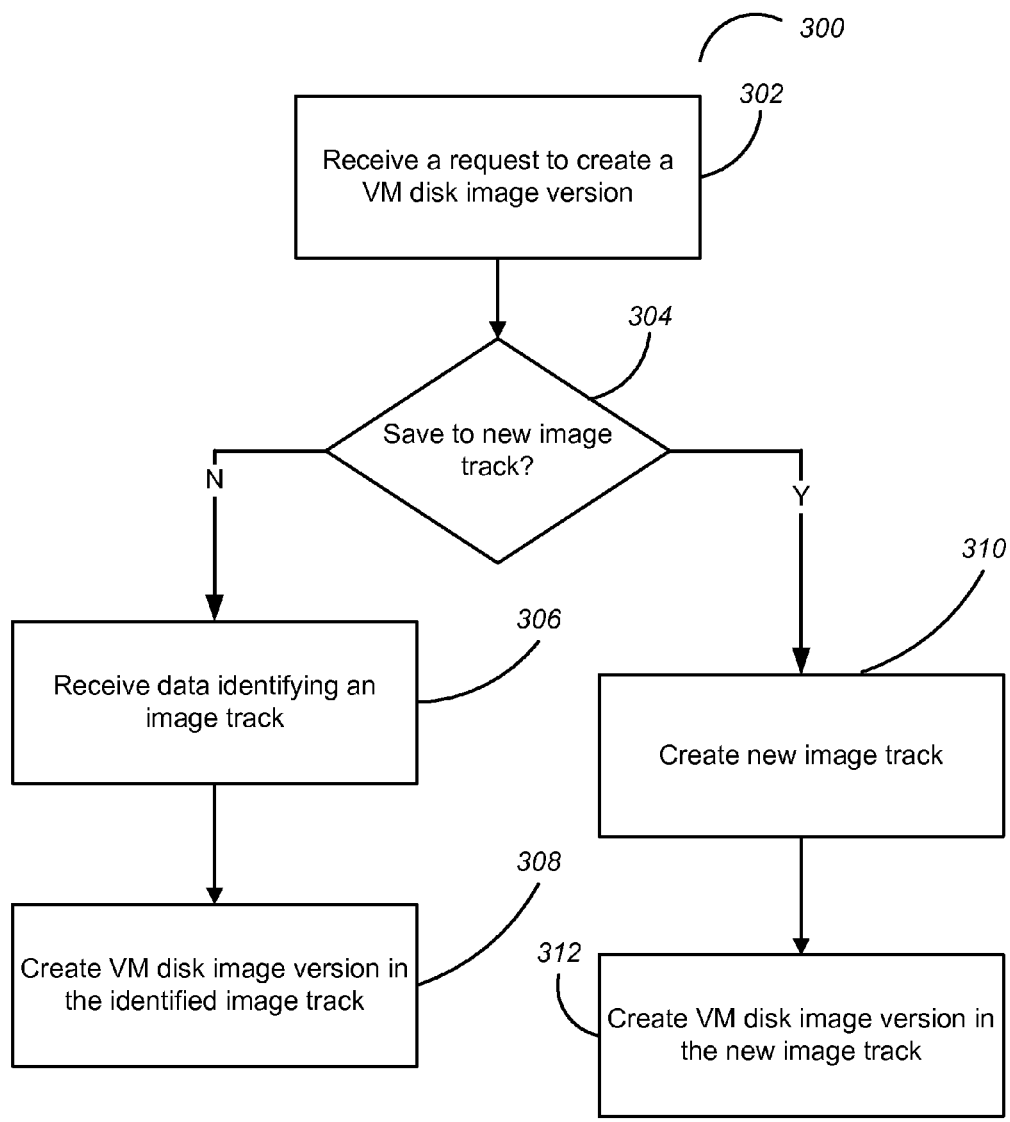
FIG. 3 is a flow diagram illustrating an example technique of creating a new VM disk image version.

FIG. 3 is a flow diagram illustrating an example technique 300 of creating a new VM disk image version. The technique 300 can be performed by a system of one or more data processing apparatus. For example, an image manager (e.g., the image manager 150 of FIG. 1) can be used to perform the technique 300.

The system receives 302 a request to create a VM disk image version, i.e., to save a particular VM disk image instance in an image track maintained by the system and to associate the VM disk image instance with a version name. The request can identify the VM disk image instance by way of a uniform resource locator (URL) that points to a VM disk image instance or by identifying a virtual disk snapshot file that the user would like to upload.

The system determines 304 whether the VM disk image version is to be saved to a new image track or an existing image track. For example, the system can provide a user interface for display that enables a user to select where the VM disk image version should be saved.

If the VM disk image instance is to be saved to an existing image track, the system receives 306 data from the user identifying an existing image track. For example, the system can provide a user interface to the user that allows the user to view and select an existing image track.

In response to receiving a user input selecting an image track, the system creates 308 a VM disk image version in the selected image track. For example, the system can add data identifying the VM disk image instance, e.g., a uniform resource locator (URL) that points to the VM disk image instance, to a data structure that stores data identifying the VM disk image instances in the selected image track and that associates a version name with each of the disk image instances.

If the VM disk image version is to be saved to a new image track, the system creates 310 a new image track based on data received from the user. That is, the system creates a new data structure representing the new image track. For example, the system can provide a user interface to the user that allows the user to create a new image track. For example, the user interface can allow the user to name the image track and assign values to one or more properties of the image track, e.g., specify a description for the image track. The system can then associate the data structure with the data identifying the new image track, i.e., the user-specified property values.

The system creates 312 the VM disk image version in the new image track. For example, the system can create a new data structure, associate the data structure with data identifying the new image track, e.g., one or more properties of the new image track and their values, and add data identifying the VM disk image instance and the version name to the new data structure.

Users can also submit requests to generate a new image label to be added to an image track and to associate a VM disk image instance with the new image label. In response to the request, the system can associate data identifying the user-specified name for the new image label with data identifying the VM disk image instance, e.g., the URL that points to the VM disk image instance. Once an image label has been generated and associated with a VM disk image instance, users can associate a new VM disk image instance, e.g., by submitting a request to the system. In response to receiving the request, the system can associate the data identifying the user-specified name for the new image label with the new VM disk image instance and delete the previous association. For example, if a "stable" image label was previously associated with a VM disk image instance that had previously been deemed to be the stable version of the VM disk instances in the image track, a user can associate the "stable" image label with a different VM disk instance that had been previously associated with a "testing" image label once that VM disk instance has been deemed to be stable.

Figure 4:
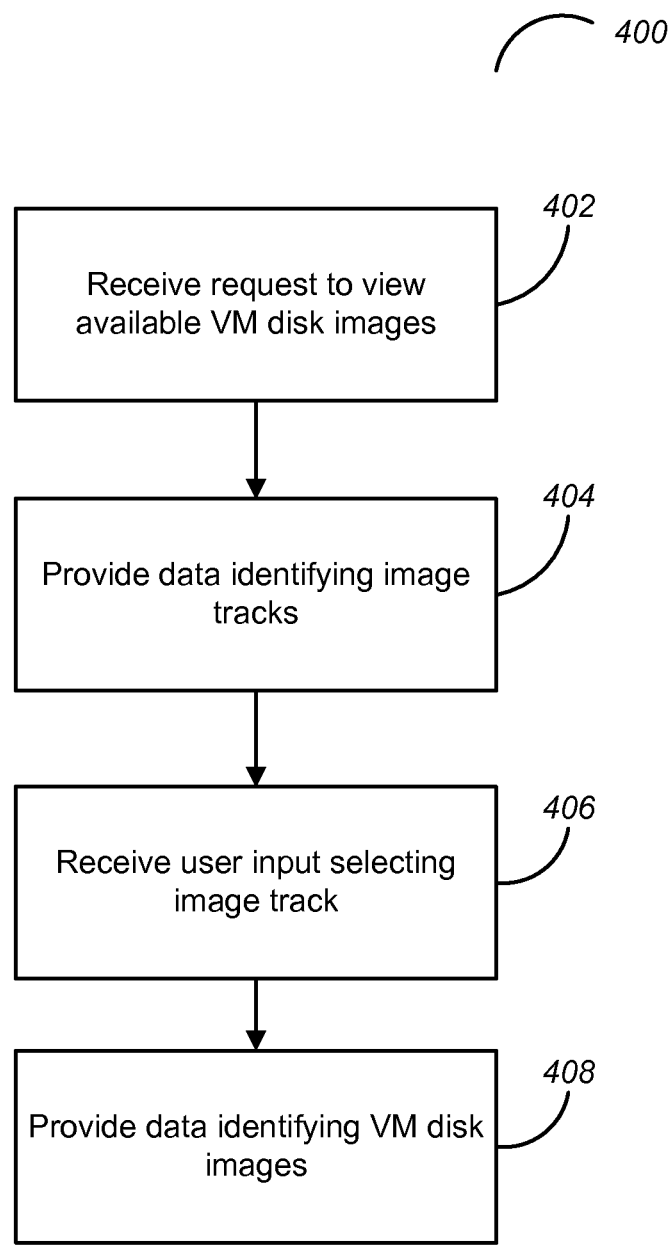
FIG. 4 is a flow diagram illustrating an example technique of processing a request to view available VM disk images.

FIG. 4 is a flow diagram illustrating an example technique 400 of processing a request to view available VM disk images. The technique 400 can be performed by a system of one or more data processing apparatus. For example, an image manager (e.g., the image manager 150 of FIG. 1) can be used to perform the technique 400.

The system receives 402 a request to view available VM disk images. For example, the system may receive the request during a VM instantiation process, i.e., in order to allow a user to select a VM disk image for use in instantiating a new VM instance.

In response to the request, the system provides 404 data identifying image tracks managed by the system for presentation to the user.

The system receives 406 a user input selecting an image track and, in response, provides 408 data identifying the VM disk images in the image track to the user. The data also identifies the image labels in the image track and the respective VM disk image instance that each label is currently associated with.

In some implementations, a user may be able to select an image label for use in instantiating a VM instance. In these implementations, the system may resolve the image label to identify the specific VM disk image instance associated with the image at any of a variety of times. For example, the system may resolve the image label only when the image label is initially selected, i.e., so that each time the VM instance is initialized, the current VM disk image instance is used. However, in some other implementations, the system can re-resolve the image label at future times, i.e., each time the VM is re-initialized or when certain other criteria are met. In these implementations, if the selected image label is associated with a different VM disk image instance in the future, the different VM disk image instance can be used to initialize the VM without a user having to make a different selection. For example, if a user selects a "stable" image label to use in instantiating a VM instance, the system can resolve the label to identify the current VM disk image instance associated with the "stable" label. At a later time, when the criteria for re-resolving the image label are met, the system can re-instantiate the VM using a different VM disk image instance that has since become associated with the "stable" label.

Figure 5:
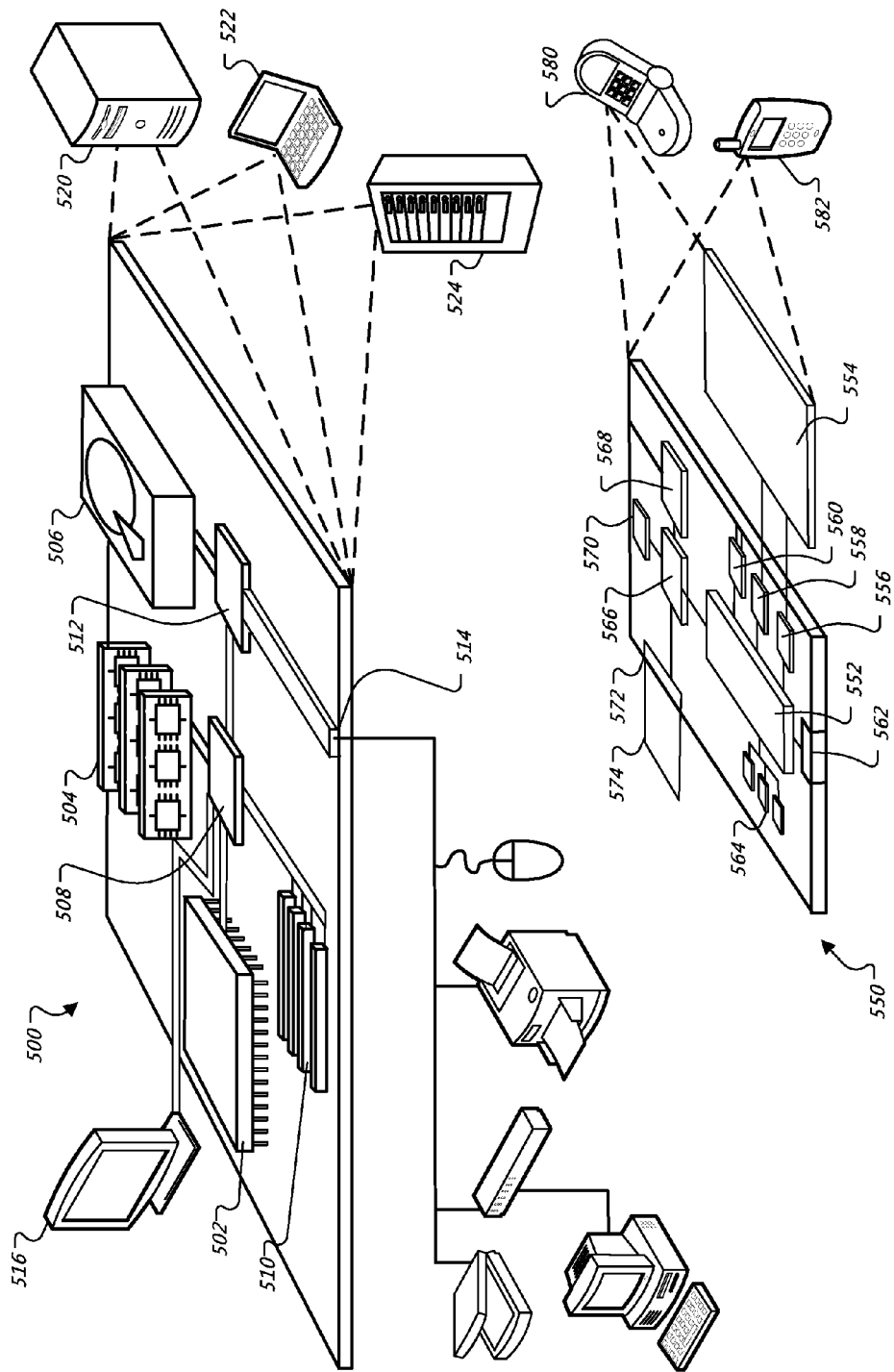
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. The phrase 'computing device' as used herein encompasses its plain and ordinary meaning, including, but not limited to, various forms of digital computers and mobile devices. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 515. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 565 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for virtual machine name resolution may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by data processing apparatus, the method comprising:
   receiving, from a first user of a first user device, a request to save a first virtual machine (VM) disk image, wherein the first VM disk image is an image of a virtual disk of a first VM instance and captures an application and operating system configuration of the first VM instance;
   in response to the request to save the first VM disk image, providing data identifying a plurality of image tracks to the first user, wherein each image track is a collection of VM disk images;
   receiving data from the first user identifying a first image track of the plurality of image tracks;
   adding the first VM disk image to the first image track, comprising associating data identifying the first VM disk image with data identifying the first image track;
   receiving, from the first user, a request to associate the first VM disk image with a first image label of one or more image labels associated with the first image track, wherein each of the image labels associates a respective user-specified logical name with a respective one of the VM disk image instances in the first image track;
   in response to the request to associate the first VM disk image with the first image label, modifying association data for the first image label to associate the first image label with the first VM disk image;
   receiving, from a second user, a request to instantiate a second VM instance using the first image label;
   determining, from the association data for the first image label, that that the first image label is associated with the first VM disk image;
   in response to determining that the first image label is associated with the first VM disk image, providing the first VM disk image for use in instantiating the second VM instance;
   receiving a request to re-resolve the label, wherein the request to re-resolve the label is triggered by a request to re-instantiate the second VM instance;
   in response to receiving the request to re-resolve the label:
      determining, from the association data for the first image label, that the first image label has become associated with a new VM disk image; and
      in response to determining that the first image label has become associated with the new VM disk image, providing the new VM disk image for use in re-instantiating the second VM instance.

2. The method of claim 1, wherein adding the first VM disk image to the first image track comprises creating a new VM disk image version in the first image track, wherein the new VM disk image version identifies the first VM disk image instance by a user-specified version name.

3. The method of claim 1, further comprising:
   receiving a request to create a new image track from a third user; and
   in response to the request to create the new image track, providing a user interface for display to the third user for specifying values of one or more properties for the new image track.

4. A system comprising:
   one or more data processing apparatus; and
   one or more non-transitory computer-readable storage devices having stored thereon instructions that, when executed by the one or more data processing apparatus, cause the one or more data processing apparatus to perform operations comprising:
      receiving, from a first user of a first user device, a request to save a first virtual machine (VM) disk image, wherein the first VM disk image is an image of a virtual disk of a first VM instance and captures an application and operating system configuration of the first VM instance;
      in response to the request to save the first VM disk image, providing data identifying a plurality of image tracks to the first user, wherein each image track is a collection of VM disk images;
      receiving data from the first user identifying a first image track of the plurality of image tracks;
      adding the first VM disk image to the first image track, comprising associating data identifying the first VM disk image with data identifying the first image track;
      receiving, from the first user, a request to associate the first VM disk image with a first image label of one or more image labels associated with the first image track, wherein each of the image labels associates a respective user-specified logical name with a respective one of the VM disk image instances in the first image track;
      in response to the request to associate the first VM disk image with the first image label, modifying association data for the first image label to associate the first image label with the first VM disk image;
      receiving, from a second user, a request to instantiate a second VM instance using the first image label;

determining, from the association data for the first image label, that that the first image label is associated with the first VM disk image;

in response to determining that the first image label is associated with the first VM disk image, providing the first VM disk image for use in instantiating the second VM instance;

receiving a request to re-resolve the label, wherein the request to re-resolve the label is triggered by a request to re-instantiate the second VM instance;

in response to receiving the request to re-resolve the label:

determining, from the association data for the first image label, that the first image label has become associated with a new VM disk image; and in response to determining that the first image label has become associated with the new VM disk image, providing the new VM disk image for use in re-instantiating the second VM instance.

5. The system of claim 4, wherein adding the first VM disk image to the first image track comprises creating a new VM disk image version in the first image track, wherein the new VM disk image version identifies the first VM disk image instance by a user-specified version name.

6. The system of claim 4, the operations further comprising:

receiving a request to create a new image track from a third user; and in response to the request to create the new image track, providing a user interface for display to the third user for specifying values of one or more properties for the new image track.

7. A non-transitory computer-readable storage device having stored thereon instructions, which, when executed by data processing apparatus, cause the data processing apparatus to perform operations comprising:

receiving, from a first user of a first user device, a request to save a first virtual machine (VM) disk image, wherein the first VM disk image is an image of a virtual disk of a first VM instance and captures an application and operating system configuration of the first VM instance;

in response to the request to save the first VM disk image, providing data identifying a plurality of image tracks to the first user, wherein each image track is a collection of VM disk images;

receiving data from the first user identifying a first image track of the plurality of image tracks;

adding the first VM disk image to the first image track, comprising associating data identifying the first VM disk image with data identifying the first image track;

receiving, from the first user, a request to associate the first VM disk image with a first image label of one or more image labels associated with the first image track, wherein each of the image labels associates a respective user-specified logical name with a respective one of the VM disk image instances in the first image track;

in response to the request to associate the first VM disk image with the first image label, modifying association data for the first image label to associate the first image label with the first VM disk image;

receiving, from a second user, a request to instantiate a second VM instance using the first image label;

determining, from the association data for the first image label, that that the first image label is associated with the first VM disk image;

in response to determining that the first image label is associated with the first VM disk image, providing the first VM disk image for use in instantiating the second VM instance;

receiving a request to re-resolve the label, wherein the request to re-resolve the label is triggered by a request to re-instantiate the second VM instance;

in response to receiving the request to re-resolve the label:

determining, from the association data for the first image label, that the first image label has become associated with a new VM disk image; and in response to determining that the first image label has become associated with the new VM disk image, providing the new VM disk image for use in re-instantiating the second VM instance.

8. The computer-readable storage device of claim 7, wherein adding the first VM disk image to the first image track comprises creating a new VM disk image version in the first image track, wherein the new VM disk image version identifies the first VM disk image instance by a user-specified version name.

9. The computer-readable storage device of claim 7, the operations further comprising:

receiving a request to create a new image track from a third user; and in response to the request to create the new image track, providing a user interface for display to the third user for specifying values of one or more properties for the new image track.

\* \* \* \* \*